July 12, 1932.    H. Y. CARSON    1,866,619
PIPE JOINT
Filed Oct. 14, 1930
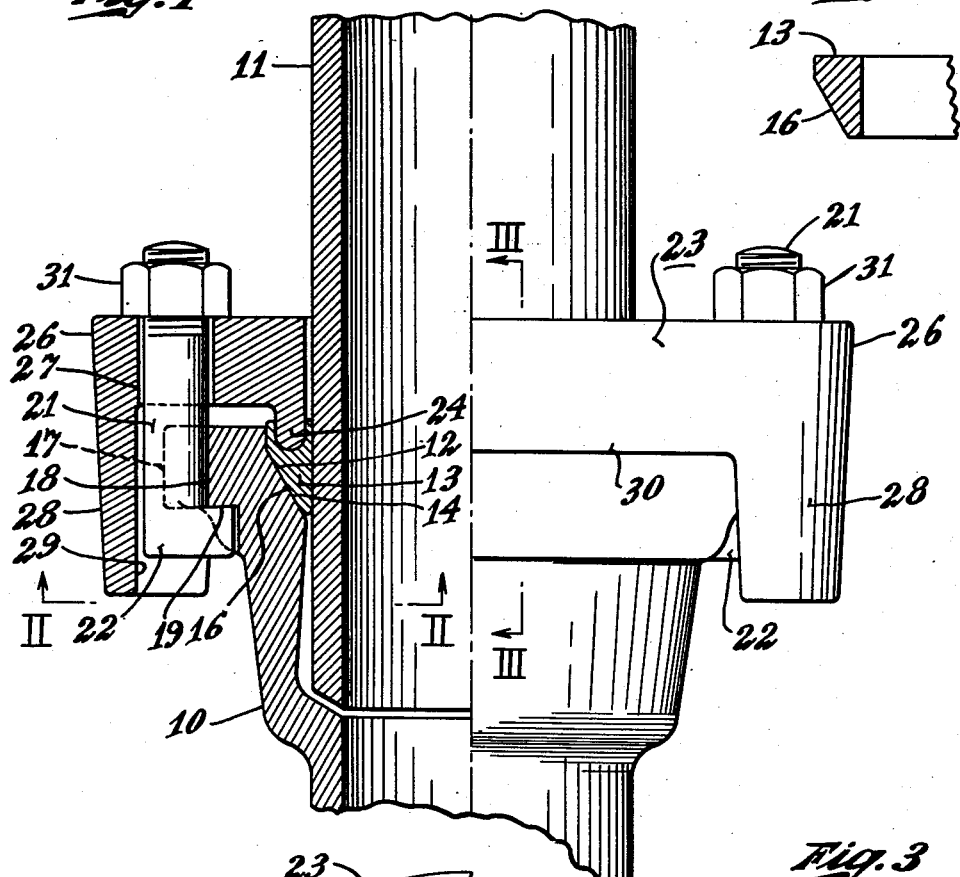
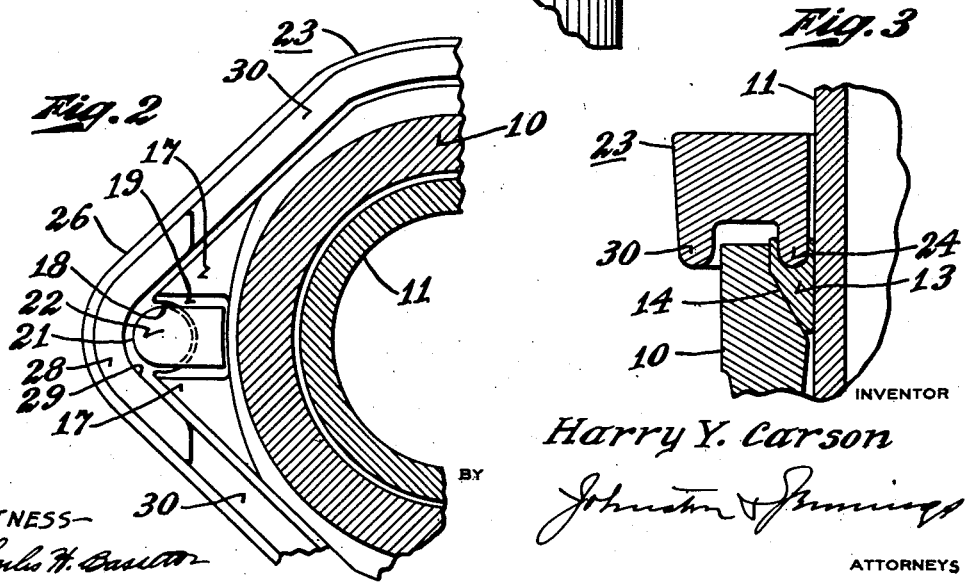
INVENTOR
Harry Y. Carson
WITNESS—
ATTORNEYS Patented July 12, 1932

1,866,619

UNITED STATES PATENT OFFICE

HARRY Y. CARSON, OF BIRMINGHAM, ALABAMA

PIPE JOINT

Application filed October 14, 1930. Serial No. 488,681.

My invention relates to pipe joints, more particularly to joints for cast iron pipe having bell and spigot ends, and has for its object the provision of a joint of the character designated which shall be simple of design, easy to manufacture, and which shall be capable of withstanding relatively high pressure.

A further object of my invention is to provide a gland type joint for cast iron pipe which shall be extremely sturdy, capable of withstanding corrosion over long periods of time, and one which may be assembled with the pipe and thus shipped from the factory.

A more specific object of my invention is to provide a gland type joint for cast iron pipe having bell and spigot ends and employing bolts for tightening the gland in place, and a flexible gasket, in which the bolts and gasket are protected against soil corrosion of the bolt and oxidation of the gasket in service, and in which lateral strain on the bolts and the gland is obviated.

Gland joints for conventional cast iron pipe have heretofore been proposed, but difficulties have been encountered in the use thereof. Among these difficulties, is that when bolts are hooked or otherwise secured to the bell end of a pipe, the conventional beveled end thereof imposes a strong lateral thrust on the bolts when the bolts are tightened, which lateral thrust is transmitted to the gland member, placing it under excessive strain. This difficulty has brought about the necessity of employing materials other than cast iron for the gland member, with consequent increased cost of the article and less resistance to corrosion, with materials commercially feasible.

I have furthermore found that gland bolts are peculiarly subject to soil corrosion when under tension. This corrosion manifests itself more along the midportion of a bolt between the head and nut than at the head and nut itself. While cast iron pipe laid in the ground will last for many years, unless means are provided to protect the gland bolts from corrosion, they have a limited life and leaks occur in the line upon failure of the gland bolts. The gasket, also, employed with gland type joints is subject to oxidation and decomposition when exposed to the elements, so that it has been found to fail often before there is a failure of the pipe with which it is associated.

These and other difficulties are overcome by means of my invention and a gland joint is provided having a useful life as long as that of the pipe with which it is associated. In this joint I provide a simple packing means adapted to withstand relatively high pressure and so construct the joint that the packing is protected against deterioration or decomposition. Briefly, my invention consists in providing the bell end of a pipe with a suitable number of recessed lugs into which gland bolts are adapted to fit. These lugs are slightly inclined from the outer edge inwardly toward the end of the pipe and the heads of the bolts are similarly inclined whereby, when the bolts are tightened, the lateral thrust on the bolts is inwardly toward the pipe rather than outwardly.

A gland surrounding the spigot end of the pipe is provided with a flange fitting into the bell end and adapted to bear against a suitable packing ring. An outer flange is also provided on the gland which telescopes over the bell end of the pipe. The gland is provided with lugs having bolt holes therein and recessed ears on the lugs which surround the bolts there entire length and serve to protect the bolts against soil corrosion. Preferably, also, the bolts are plated or coated with a corrosion resistant material.

Apparatus embodying features of my invention is shown in the accompanying drawing forming a part of this application, in which:

Fig. 1 is a view partly in elevation and partly in section showing my improved joint assembled;

Fig. 2 is a sectional view taken along the line II—II of Fig. 1;

Fig. 3 is a sectional view taken along the line III—III of Fig. 1; and

Fig. 4 is a sectional view of resilient packing ring employed in my improved pipe joint, removed from the joint.

Referring to the drawing for a better understanding of my invention, I show a bell end of a pipe 10 having a spigot end 11 fitted thereinto and equipped with my improved joint. As is customary, in the design of such pipe, there is provided a recess 12 at the outer end of the bell end of the pipe for the reception of a packing ring 13. The lower end of the recess is inclined inwardly at 14 and the packing ring 13 is provided with a cooperating inclined portion 16 fitting into the recess. The packing ring 13 is preferably made of resilient material, such as rubber or asbestos composition and the like whereby it may be compressed into the recess.

On the outer perimeter of the bell end of the pipe 10, I provide an overhanging portion 17, which in the present instance is shown to be interrupted, to form lugs or bolt anchors, two being shown. The lugs 17 may be provided with longitudinally extending recesses 18 for the positioning of gland bolts and the lower edges, as seen in the drawing, are provided with inclined surfaces 19, the surfaces being inclined inwardly and toward the end of the pipe. Fitting into the recesses 18 are gland bolts 21 having heads 22 thereon, the heads being formed complemental to the inclined surfaces 19 and fitting thereover.

Surrounding the spigot end of the pipe is a gland 23 having a flange 24 thereon, the flange being rounded, as shown, the better to expand the packing ring against the cooperating pipe surfaces. The gland 23 is provided with lugs 26 opposite the lugs 17 on the bell end of the pipe, and have holes 27 therein for the gland bolts 21. Formed on the lugs 26 are longitudinally extending ears 28 having recesses 29 therein which embrace the bolts 21 the full length thereof, the sides of the ears lying in close proximity to the sides of the pipe. Nuts 31 on the bolts 21 serve to draw the gland tightly against the packing ring 13 forcing it into tight engagement with the pipe sections, the ring being distorted to the cross sectional shape shown in Fig. 1 by the pressure of the gland flange. An outer flange 30 is also provided on the gland 23, which flange telescopes over the bell end of the pipe, lying closely adjacent to the outer surface of the bell end of the pipe when the gland is tightened in place.

It will be seen from the foregoing, that when the bolt heads 22 are engaged with the lugs 17 and the nuts 31 tightened up, the lateral thrust on each bolt is inwardly toward the pipe thereby holding the bolt in tight engagement with the bell end of the pipe and placing no lateral strain upon the gland 23. The only strain therefore upon the bolt 21 is a tension strain.

The ears 28 on the lugs 26 embracing the bolts 21 serve to obviate soil corrosion. I have found, after this joint has been in service for some time that rust tubercles form between the cast iron ears 28 and the adjacent ends of the cast iron pipe, totally encasing the bolts 21 and preventing oxidation and corrosion of the bolts. Similar tubercles form between the flange 30 and the bell end of the pipe totally encasing the packing ring 13, protecting it from elements and obviating decomposition thereof. Preferably also, the bolts 21 are plates with a corrosion resistant material, such as cadmium or zinc, which plating may be done by well known galvanizing processes.

From the foregoing it will be seen that I have devised an improved pipe joint of the gland type, in which the gland may be made of ordinary cast iron at a low cost and having the necessary strength to cooperate with a suitable packing and cause the joint to withstand relatively high pressure. It will also be apparent that my improved pipe joint is capable of withstanding corrosive action and will have a life equal to that of the cast iron pipe with which it is associated.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a joint for pipe having bell and spigot ends, a gland, a packing ring between the bell and spigot in the joint, a flange on the inner edge of the gland to engage and compress said packing ring into the joint, said bell having projecting portions adapted to be engaged by bolts, and bolts assembled with said gland and having angled ends adapted to engage under said projections on the bell, said gland having an outer flange which fits closely about the bell and about the body portion of the bolt under tension to form joint spaces with the bell close enough to be sealed by rust tubercles so as to enclose and protect said body portion of the bolt and said packing ring.

2. In a pipe joint, means cooperating with a pipe to define a packing ring pocket, a packing ring mounted in said pocket, a gland, a flange provided on the inner edge of said gland to engage and compress said packing ring into said pocket, projection portions provided on the outer wall of the packing ring pocket, and bolts assembled with said gland and having angled ends adapted to engage under said projection portions, said gland having an outer flange which fits closely about the outer wall of the packing ring pocket and about the body portion of the bolts under tension to form joint spaces with the outer wall of the packing ring pocket close enough to be sealed by rust tubercles so as to enclose and protect said body portion of the bolt and said packing ring.

In testimony whereof I affix my signature.

HARRY Y. CARSON.